United States Patent
Siegl

(10) Patent No.: US 8,617,676 B2
(45) Date of Patent: Dec. 31, 2013

(54) PREFORM FOR PRODUCING PLASTIC CONTAINERS IN A TWO-STAGE STRETCH BLOW-MOULDING PROCESS

(75) Inventor: Robert Siegl, Dornbirn (AT)

(73) Assignee: Alpha Werke Alwin Lehner GmbH & Co., KG, Hard (AT)

( * ) Notice: Subject to any disclaimer, the term of this patent is extended or adjusted under 35 U.S.C. 154(b) by 17 days.

(21) Appl. No.: 13/478,601

(22) Filed: May 23, 2012

(65) Prior Publication Data

US 2012/0231191 A1 Sep. 13, 2012

Related U.S. Application Data

(63) Continuation of application No. PCT/EP2010/006021, filed on Oct. 2, 2010.

(30) Foreign Application Priority Data

Dec. 23, 2009 (CH) .................................. CH1980/09

(51) Int. Cl.
*B29B 11/14* (2006.01)

(52) U.S. Cl.
USPC ....... 428/35.7; 428/36.9; 428/542.8; 215/371

(58) Field of Classification Search
USPC ............. 428/35.7, 542.8, 36.9, 36.91, 36.92; 215/371
See application file for complete search history.

(56) References Cited

U.S. PATENT DOCUMENTS

| 3,347,965 A | 10/1967 | Valyi |
| 5,047,271 A | 9/1991 | Feddersen et al. |
| 2006/0051541 A1* | 3/2006 | Steele .......................... 428/35.7 |

FOREIGN PATENT DOCUMENTS

| DE | 29 10 609 A1 | 9/1980 |
| JP | 1-182022 A | 7/1989 |
| WO | WO 2011/002294 | * 1/2011 |

OTHER PUBLICATIONS

International Search Report (PCT/ISA/210) issued on Dec. 28, 2010, by the European Patent Office as the International Searching Authority for International Application No. PCT/EP2010/006021.

* cited by examiner

*Primary Examiner* — Ellen S Raudenbush
*Assistant Examiner* — Yan Lan
(74) *Attorney, Agent, or Firm* — Buchanan Ingersoll & Rooney PC

(57) ABSTRACT

A preform is disclosed for producing plastic flasks in a two-stage stretch blow-molding process, including a preform base, an elongated preform body, including one longitudinal end sealed to the preform base and another longitudinal end sealed to the neck portion a neck portion with threaded sections or positive protrusions, wherein the preform is manufactured from a plastic that is suitable for the stretch blow-molding process, which has a refractive index of 1.3 to 1.6 at a temperature of 10° C. to 120° C., and in that an outside wall and an inside wall of the preform base bound a flat divergent lens, and in each case have radii of curvature (c, b) that are larger by at least a factor 1.4 than a related radius of curvature (s) of an outside wall or a radius of curvature (R) of an inside wall of the preform in the area of the preform body.

20 Claims, 1 Drawing Sheet

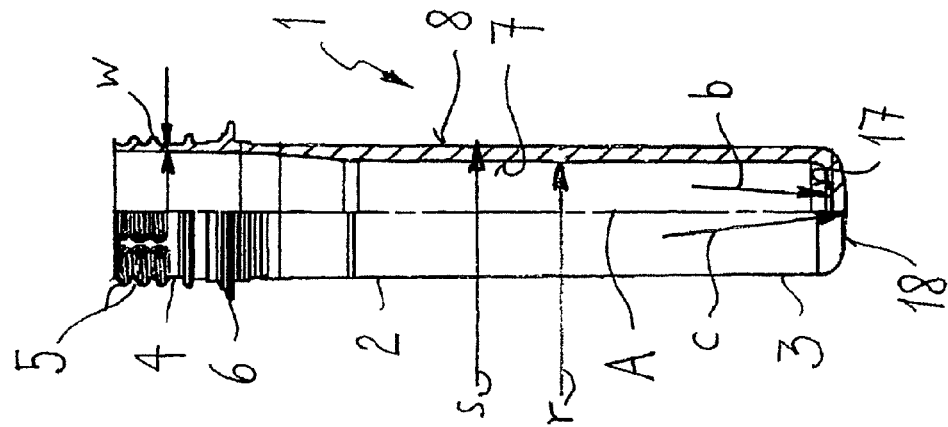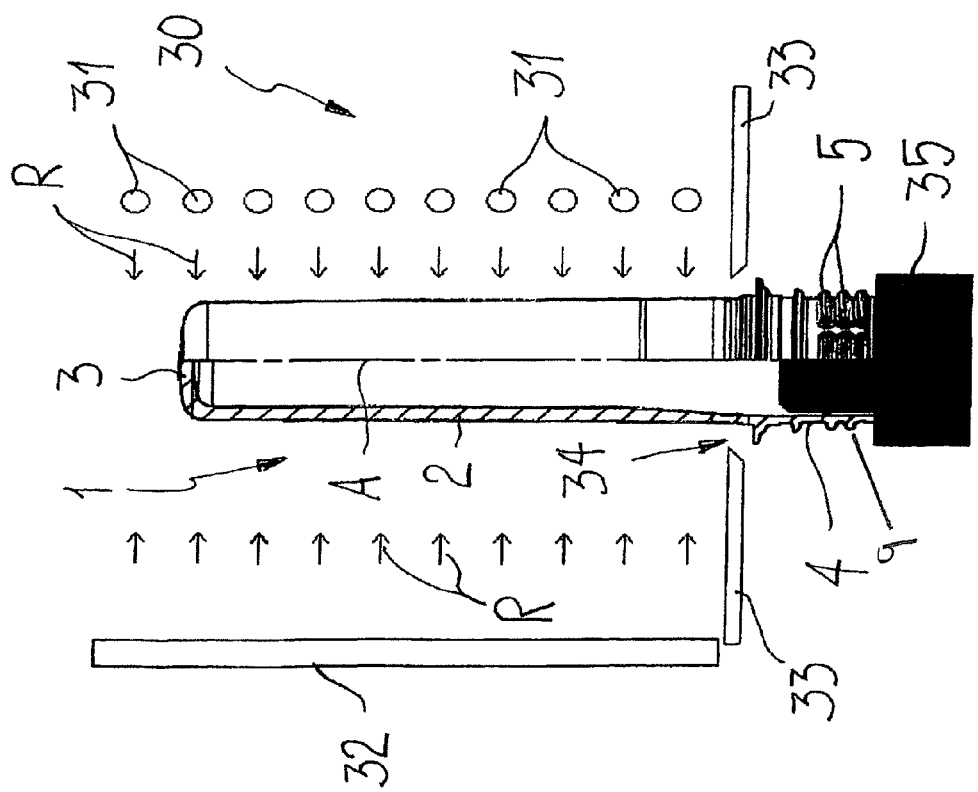

PREFORM FOR PRODUCING PLASTIC CONTAINERS IN A TWO-STAGE STRETCH BLOW-MOULDING PROCESS

RELATED APPLICATION(S)

This application claims priority as a continuation application under 35 U.S.C. §120 to PCT/EP2010/006021, which was filed as an International Application on Oct. 2, 2010, designating the U.S., and which claims priority to Swiss Application 01980/09 filed in Switzerland on Dec. 23, 2009. The entire contents of these applications are hereby incorporated by reference in their entireties.

FIELD

The disclosure relates to a preform for producing plastic containers in a two-stage stretch blow-molding process.

BACKGROUND INFORMATION

A number of plastic containers that are now used, for example, plastic flasks and the like—are produced in a stretch blow-molding process. In this method, a so-called preform—which can have an elongated, tube-like shape and a base on one longitudinal end and a neck area with formed threaded sections or the like on the other longitudinal end—is inserted into a mold cavity of a blow mold and blown in through a medium that is injected with overpressure. In this case, the preform can be additionally elongated in the axial direction with an elongated mandrel that is run in through the neck opening. After the elongation/blow-molding process, the finished plastic container is demolded from the blow mold.

A single- or multi-layer preform can be produced in a separate injection-molding method before the stretch blow-molding process. It has also been proposed to produce preforms in a plastic extrusion press method. As raw material for the production of plastic containers in the stretch blow-molding process, polypropylene or PET (polyethylene terephthalate) can be used. Polypropylene and PET have been tested multiple times, and their properties are adequately known. In the so-called single-stage stretch blow-molding process, the preform is inflated and elongated directly after its production to form a plastic container. In some cases the plastic containers can be produced in a two-stage method at a different place and time from the stretch blow-molding process and can be intermediately stored for later use. In the later stretch blow-molding process, the preforms are heated again, introduced into a blow mold, stretched with an elongated mandrel in the longitudinal direction, and inflated according to the mold cavity by overpressure to form a plastic container. In this way, both processes—the injection-molding and the stretch blow-molding—can be operated separately and optimally.

The preforms that are used in the stretch blow-molding method can have an elongated shape and a convex base that is curved outward. The neck area of the preform can be already completely formed and can be provided with threaded sections or similar positive protrusions, which make it possible to attach a closure or cover, which can be equipped with correspondingly designed locking elements. In the two-stage process, the preforms can be heated again to their deformation temperature range before the stretch blow-molding. To this end, the preforms can be plugged with their neck areas into finger-like holding devices and transported through a heating station. In some cases, the heating of the preforms can be carried out via infrared radiation or near-infrared radiation, which can be generated by quartz tube radiators. For better use of the energy emitted by the quartz tube radiators, one or more mirrors can be provided that reflect the electromagnetic radiation. In the heating station, the preforms are transported between the quartz tube radiators and the mirrors facing them.

Through the bomb-shaped base of the preform, the irradiated infrared radiation can travel by scattering or directly to the finger-like holding devices of the preforms, which can thus be heated. To prevent deformations of the neck area of the preform that can be formed with high accuracy, the finger-like holding devices can be cooled. Because the absorbed irradiated energy often cannot be drained off to a sufficient extent even by the cooling of the holding devices, the preform neck can be designed with a relatively larger wall thickness than would be necessary for the plastic container that is to be manufactured from the preform. During stretch blow-molding, the preform can be stretched longitudinally using an elongated mandrel. In the area of the support surface of the base of the preform with the elongated mandrel, the base can cool relatively quickly, and an undesirable accumulation of amorphous material can occur in the base area of the plastic container that is produced in the stretch blow-molding process.

SUMMARY

A preform is disclosed for producing plastic flasks in a two-stage stretch blow-molding process, comprising a preform base, an elongated preform body, including one longitudinal end sealed to the preform base and another longitudinal end sealed to the neck portion a neck portion with threaded sections or positive protrusions, wherein the preform is manufactured from a plastic that is suitable for the stretch blow-molding process, which has a refractive index of 1.3 to 1.6 at a temperature of 10° C. to 120° C., and in that an outside wall and an inside wall of the preform base bound a flat divergent lens, and in each case have radii of curvature (c, b) that are larger by at least a factor 1.4 than a related radius of curvature (s) of an outside wall or a radius of curvature (R) of an inside wall of the preform in the area of the preform body.

BRIEF DESCRIPTION OF THE DRAWINGS

Further advantages and exemplary embodiments of the disclosure follow from the descriptions with reference to the drawings. Here, in depictions that are not to scale:

FIG. 1 shows a preform according to an exemplary embodiment of the disclosure in an axial section on half a side in a heating station; and FIG. 2 shows a preform according to an exemplary embodiment of the disclosure in an axial section on half a side.

DETAILED DESCRIPTION

According to exemplary embodiments of the disclosure, a preform can be provided that makes it possible to design the neck area also with relatively reduced wall thicknesses. In the further processing of the preform to form a plastic container in a two-stage stretch blow-molding process, undesirable accumulations of amorphous material in the base area of the container can be avoided.

A preform for producing plastic containers in a two-stage stretch blow-molding process, according to an exemplary embodiment of the disclosure, has an elongated preform body whose one longitudinal end is sealed to a base and whose other longitudinal end can be connected to a neck section with threaded sections or similar positive protrusions. The preform can be manufactured from a plastic that is suitable for the stretch blow-molding process, which has a refractive index of about 1.3 to 1.6 (±10%) at a temperature of about 10° C. to 120° C. (±10%). The preform base can be designed in such a way that it's outside wall and it's inside wall bound a flat divergent lens. The outside wall and the inside wall of the preform base that can be designed as a divergent lens can have radii of curvature that are larger by at least the factor of about 1.4 (±10%) than the radii of curvature of the related outside wall or inside wall in the area of the preform body.

In combination with the refractive index of the preform material, configuring the preform base as a flat divergent lens can cause the irradiated electromagnetic heat radiation to be deflected away from the finger-like holding device. By the configuration of the preform body according to an exemplary embodiment of the disclosure, a larger proportion of the introduced electromagnetic heat radiation can be absorbed in the preform base and in the preform wall. As a result, less radiation energy can run to the finger-like holding device of the preform during its transport through the heating station, and the holding device can be less heated. The neck portion of the preform, which is in direct contact with the finger-like holding device, can thus also be less heated. As a result, the risk of a deformation of the neck portion can be reduced, and there is the possibility of designing the neck portion with a smaller wall thickness. The decrease in the wall thickness of the preform in the neck portion can lead to a reduction of the necessity for labor-intensive raw material. Specifically in mass-produced articles such as plastic containers, a material reduction can have economic and ecological advantages.

Overall, the design according to an exemplary embodiment of the disclosure can result in a flattening of the preform base. As a result, during the stretching process, there can be at first only a small area to form a contact between the elongated mandrel, whose front end has a small radius of curvature, and the preform base with a comparatively large radius of curvature. Only at relatively high elongation speeds and pressures and toward the end of the mechanical elongation process is this contact area increased. As a result, the local cooling of the perform base can be limited to a very small area, and undesirable accumulations of amorphous material in the base area of the plastic container that is produced can be avoided. Rather, the as-yet not cooled plastic material in the preform base can be available for the rest of the blow-molding process. This can also make possible a smaller use of material in the base of the preform.

In one exemplary embodiment of the disclosure, the preform base that is designed as a flat divergent lens in the area of the axis of the preform or in the center of the divergent lens can have wall thickness that is at least 0.2 mm smaller than a wall thickness of the preform base at the transition in the preform body.

The base of the preform can be configured in such a way that an electromagnetic heat radiation of a wavelength of about 0.5 μm to 2 μm, which is introduced into the area of the base substantially perpendicular (e.g., within 10°, or more or less) to the preform axis, can be absorbed to a significant extent (e.g., substantially absorbent to, for example, 90% or lesser or greater) by total reflection within the base and/or the body of the preform. Thus, relatively little electromagnetic radiation can reach the finger-like holding device, and the neck portion that is in contact with the holding device can be less heavily heated. By a larger proportion of the introduced heat radiation being absorbed in the preform base and/or the preform body, the efficiency of the preform heating can also be increased.

The preform base can be designed plano-concave or convex-concave. In this case, the terms "plane" or "convex" can relate to the first surface on which the electromagnetic radiation takes place, for example, to the outside wall of the preform base. The term "concave" relates to the opposing inside wall of the preform base. The outside wall of the base of the preform is to have a larger radius of curvature than the inside wall of the preform in the area of its base. In the case of a flat design of the outside wall, the radius of curvature is infinitely large.

Preforms, according to exemplary embodiments of the disclosure and are provided for further processing in a two-stage stretch blow-molding process, can include plastics or plastic mixtures from the group that includes (e.g., consists of) polyester, PET (polyethylene terephthalate), polyolefins, polystyrenes, and PLA (polylactic acids).

A preform, according to an exemplary embodiment of the disclosure can be composed of one or more layers depending on the application provided. It can also have barrier additives, in particular oxygen traps, nanoclays or UV blockers. In another exemplary embodiment of the disclosure, the preform that is composed of multiple layers can also have a barrier layer against oxygen and/or UV radiation and/or a slide coating and/or a residual discard coating.

A preform, according to an exemplary embodiment of the disclosure can be produced, for example, in a plastic spraying method. Plastic spraying methods or injection-molding methods have been tested sufficiently and can result in preforms with the desired accuracy. In this case, an injection point of the preform can be located in the area of the base. In the plastic container that is produced from the preform, it is thus generally not visible in the deployed position.

The plastic extrusion press method represents an alternate production method for the preform, which can also lead to high-quality results and suited for mass production.

A preform according to an exemplary embodiment of the disclosure can also be produced in an extrusion blow-molding method. This production method can be distinguished by its high throughput and low production costs and can be suitable for preforms that are composed of multiple layers. Multi-layer preforms can also be produced in a so-called "over-molding" method.

A preform according to an exemplary embodiment of the disclosure can be provided, at least in places, with a color that deviates from the usual preform body or can have at least one color layer in a multi-layer variant embodiment. The varying coloration or the color layer can also be used, for example, to absorb and specifically in the preform material—the radiation energy that is introduced when the preform is heated.

In another exemplary embodiment of the preform, it can also be provided that the latter has an outside wall in its base area that has a greater roughness than an outside wall of the body of the preform. The increased roughness can also be used for a better absorption of the introduced radiation energy in the preform material.

An exemplary embodiment of the preform, that is desirable relative to the reduced use of material, can have a neck portion that has—in the area of the threaded sections or similar positive protrusions—a minimum wall thickness that is smaller by at least 20% than a mean wall thickness in the area of the preform body.

In an exemplary embodiment of the disclosure, the neck portion in the area of the threaded sections or similar positive protrusions, in particular on the threaded base, can have a minimum wall thickness that is smaller than 1.34 mm.

Plastic containers, which are manufactured in a two-stage stretch blow-molding process from a preform according to the exemplary embodiments of the disclosure, can have a better and more homogeneous material distribution than known plastic containers, and thus have more uniform properties of strength relative to mechanical and thermal stresses, for example in applications in which the contents are dispensed hot.

FIG. 1 diagrammatically shows a preform with half a side axially cut away, which is provided overall with the reference number 1 during its transport through a heating station 30. The preform 1 has an elongated preform body 2, whose one longitudinal end is sealed with a preform base 3. A neck portion 4, on whose outside threaded sections 5 or the like are made, is connected to the opposing end section of the preform body 2. The threaded sections 5 or the like allow the screwing-on of a closure or cover that is equipped with corresponding locking elements. The preform 1 is produced, for example, in a plastic spraying method or in an extrusion press method. It can also be produced in an extrusion blow-molding method. The preform 1 is an intermediate product of the two-stage stretch blow-molding process in which first the preform 1 is produced and, at a different time and place, the preform is reshaped by axial stretching and radial inflation to form a plastic container. The two-stage stretch blow-molding process has the advantage that the preform production and the production of the plastic container can be carried out independently of one another in each case with the optimum clock rate. An injection point 9 of the preform can be located in the area of the base.

So that the preform 1 can be stretched in the stretch blow-molding device and inflated by overpressure, it first can be heated again to a temperature that is necessary for the stretch blow-molding process. To this end, it is transported through one or more heating stations 30. The heating station 30 can include a number of heat lamps, for example, quartz tube radiators 31, which emit electromagnetic radiation R in the near-infrared and infrared ranges. The wavelength of the emitted radiation is in the range of about 0.5 µm to 2 µm (±10%). Several quartz tube radiators 31 can be arranged one on top of the other. A reflector arrangement 32, for example, metal reflectors, can be provided facing the quartz tube radiators 31, which reflects the electromagnetic radiation R that is emitted by the quartz tube radiators. The preform 1 is transported through a channel between the quartz tube radiators 31 and the reflector arrangement 32. To this end, it is plugged in headfirst with a neck portion 4 on a finger-like holding device 35, which can be transported continuously or clocked through the heating station 30. Usually, in this case, the finger-like holding device 35 can also be rotated around its axis, so that the preform 1 is heated from all sides. The finger-like holding device 35 moves below a stationary or movable partition 33, which is provided with a slot-shaped opening 34 for the preform 1. The partition 33 can prevent the heating electromagnetic radiation R from the quartz tube radiators 31 or from the mirror arrangement 32 from moving to the finger-like holding device 35 and the neck portion 4 of the preform 1. The finger-like holding device 35 can be provided with cooling, for example water cooling, to prevent it from being heated excessively. Because of this heating, the neck portion 4 of the preform 1 that can be manufactured with high precision and that is in indirect contact with the finger-like holding device 35 could otherwise soften and become deformed.

Because of the partition 33, relatively little electromagnetic radiation can move into the finger-like holding device 35. The highly bomb-shaped preform can lead to electromagnetic heat radiation that is introduced into the area of the base being carried by diffraction and multiple reflections to the finger-like holding device 35 and heating the latter. Thus, a preform 1, according to an exemplary embodiment of the disclosure can be manufactured from a plastic that is suitable for the stretch blow-molding process and that has a refractive index of about 1.3 to 1.6 (±10%) at a temperature of about 10° C. to 120° C. (±10%). The preform base 3 has an inside wall 17 and an outside wall 18 that bound a flat divergent lens. The radii of curvature b, c of the inside wall 17 or the outside wall 18 of the preform base (3) are larger at least by a factor of about 1.4 (e.g., ±10%) than the related radii of curvature r, s of the inside wall 7 and the outside wall 8 of the preform body 2. In the area of axis A of the preform 1, which at the same time forms the center of the divergent lens, the preform base 3 can have a wall thickness that is at least 0.2 mm smaller than in the area of the transfer to the preform body 2. In particular, the preform base 3 can be designed in such a way that electromagnetic radiation, which can be introduced substantially perpendicular to the preform axis A, of a wavelength of about 0.5 µm to 2 µm (e.g., ±10%) can be absorbed to a significant extent by total reflection within the preform base 3 and/or the body 2 of the preform 1.

FIG. 2 shows a preform according to an exemplary embodiment of the disclosure that in turn is referred to overall with the reference number 1 in a depiction that is axially cut on half a side. The elongated, substantially cylindrical preform body bears the reference number 2, and the preform base is referred to as 3. The neck portion that is adjacent to the preform body 2 bears the reference number 4, and the threaded sections are indicated at 5. The axis of the preform is provided with the reference number A. A transfer ring 6 separates the neck portion 4 from the preform body 2. The transfer ring 6 is used to transport and to support the preform and the plastic container produced therefrom in certain unit sections of the stretch blow-molding device. In the area of the preform body 2, the preform 1 has an inside wall 7 as well as an outside wall 8. The inside wall 7 in the area of the preform body 2 has a radius of curvature r. The outside wall 8 of the preform body 2 has a radius of curvature that is provided with the reference number s. In the area of the preform base 3, the inside wall is provided with the reference number 17, and the outside wall is provided with the reference number 18. The inside wall 17 in the area of the preform base 3 has a radius of curvature that is indicated at b, and the outside wall 18 in the area of the preform base 3 has a radius of curvature that is indicated at c.

The preform base 3 is designed according to the type of a plano-concave or convex-concave divergent lens. The terms "plano" or "convex" refer in this case to the first surface on which the irradiated electromagnetic radiation strikes, i.e., on the outside wall 18 of the preform base 3. The term "concave" relates to the opposing inside wall 17 of the preform base 3. The outside wall 18 of the preform base 3 has a larger radius of curvature c than the inside wall 17 of the preform body. In the case of a flat design of the outside wall 18 of the preform base 3, the radius of curvature c is infinitely large.

Because of the design of the preform base 3 according to an exemplary embodiment of the disclosure, the bulk of the electromagnetic radiation, irradiated in the area of the preform base 3, of the wavelength of about 0.5 µm to 2 µm (±10%) is absorbed by total reflection within the preform base 3 and/or the body 2 of the preform 1 or is reflected outward again from the inside wall of the preform 1. Total reflection takes place with the transition from optically denser medium to optically thinner medium. An electromagnetic radiation that transitions from an optically denser medium (medium with a higher refractive index n1) into an optically thinner medium (medium with a smaller refractive index n2) is broken away according to the Snellius refraction law at the interface of the axis of incidence. The refractive angle is larger than the angle of incidence of the electromagnetic radiation (for example, infrared radiation). If the angle of incidence is increased, the refracted beam, starting at a certain angle, runs parallel to the interface. This critical angle is also the angle of total reflection. The angle of total reflection comes out as arcsine (n2/n1). Owing to the design of the preform base 3 according to an exemplary embodiment of the disclosure, the bulk of the electromagnetic radiation that is irradiated flat in the base area can be absorbed.

The flat design of the preform base 3 can also have advantages with respect to the interaction of the preform base 3 with the elongated mandrel. During stretch blow-molding, the perform 1 is elongated using an elongated mandrel in longitudinal direction. The elongated mandrel has a relatively small radius of curvature on its free front end, while the radius of curvature b of the inside wall 17 of the preform base 3 can be relatively large. Thus, during the stretching process, it can result only in a very small contact area between the preform base 3 and the elongated mandrel. As a result, the preform base 3 cools to a lesser extent, and the plastic material that is found therein is further available for the stretching and blow-molding process.

A preform 1 according to an exemplary embodiment of the disclosure for further processing in a two-stage stretch blow-molding process can include plastics that are suitable for the stretch blow-molding process, which at a temperature of about 10° C. to 120° C. (±10%) have a refractive index of about 1.3 to 1.6 (e.g., ±10%), for example, polyester, PET (polyethylene terephthalate), polyolefins, polystyrenes, and PLA (polylactic acids) or mixtures thereof. The preform 1 can be composed of one or multiple layers. It can be provided with additives that are used as barriers against oxygen, water vapor, or carbon dioxide and/or with fillers.

The preform 1 can have one or more color layers and/or barrier coatings and/or slide coatings and/or residual discard coatings.

Because of the poor heating of the finger-like holding device during transport through the heating station, the neck portion 4 of the preform 1 can also be heated to a lesser extent. As a result, it can be designed in the neck portion with a smaller wall thickness than known preforms with heavy bomb-shaped bases. Thus, preforms can be used whose neck portions in the area of threaded sections or similar positive protrusions have a minimum wall thickness w that is smaller by at least 20% than a mean wall thickness in the area of the preform body.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A preform for producing plastic flasks in a two-stage stretch blow-molding process, comprising:
    a preform base;
    a neck portion with threaded sections or positive protrusions;
    an elongated preform body, including one longitudinal end sealed to the preform base and another longitudinal end sealed to the neck portion, wherein the preform is manufactured from a plastic that is suitable for a stretch blow-molding process, which has a refractive index of 1.3 to 1.6 at a temperature of 10° C. to 120° C.; and
    an outside wall and an inside wall of the preform base delimit a flat divergent lens shape, and in each case have radii of curvature (c, b) that is larger by at least a factor 1.4 than a related radius of curvature (s) of an outside wall or a radius of curvature (R) of an inside wall of the preform in an area of the preform body.

2. The preform according to claim 1, wherein the preform base that is designed as a flat divergent lens has a wall thickness, in an area of the preform axis, that is smaller by at least 0.2 mm than its wall thickness in an area of its transition into the preform body.

3. The preform according to claim 1, wherein preform base is formed as a flat divergent lens in such a way that an electromagnetic radiation (R) of a wavelength of 0.5 µm to 2 µm, when introduced substantially perpendicular (A) to the preform axis, is substantially absorbed by total reflection into the preform base and/or into the preform body.

4. The preform according to claim 1, wherein the preform is manufactured from a plastic or from a plastic mixture of the group that consists of polyester, PET, polyolefins, polystyrenes and PLA.

5. The preform according to claim 1, wherein the preform comprises:
    one or multiple layers.

6. The preform according to claim 1, wherein the preform contains an injection point from an injection molding located in an area of the base of the preform.

7. The preform according to claim 1, wherein the preform is produced as a plastic extrusion press preform.

8. The preform according to claim 1, wherein the preform is produced as an extrusion blow-molded preform.

9. The preform according to claim 1, wherein the preform comprises:
    multiple layers and has at least one color layer.

10. The preform according to claim 1, wherein the preform base comprises:
    an outside wall that has a greater roughness than an outside wall of the preform body.

11. The preform according claim 1, wherein in an area of the threaded sections or protrusion of the neck, the neck portion has a minimum wall thickness (w) that is smaller by at least 20% than a mean wall thickness in an area of the preform body.

12. The preform according to claim 1, wherein an area of the threaded section or similar positive protrusion of the neck has a minimum wall thickness that is smaller than 1.34 mm.

13. The preform according to claim 2, wherein preform base is formed as a flat divergent lens in such a way that an electromagnetic radiation (R) of a wavelength of 0.5 µm to 2 µm, when introduced substantially perpendicular (A) to the preform axis, is substantially absorbed by total reflection into the preform base and/or into the preform body.

14. The preform according to claim 13, wherein the preform comprises:
    one or multiple layers.

15. The preform according to claim 14, wherein the preform base comprises:
    an outside wall that has a greater roughness than an outside wall of the preform body.

16. The preform according to claim 14, wherein the preform contains an injection point from an injection molding located in an area of the base of the preform.

17. The preform according to claim 16, wherein the preform comprises:
    multiple layers and has at least one color layer.

18. The preform according to claim 16, wherein the preform base comprises:
   an outside wall that has a greater roughness than an outside wall of the preform body.

19. The preform according claim 16, wherein in an area of the threaded sections or protrusion of the neck, the neck portion has a minimum wall thickness (w) that is smaller by at least 20% than a mean wall thickness in an area of the preform body.

20. A plastic container manufactured in a two-stage stretch blow-molded process from the preform according to claim 1.

* * * * *

UNITED STATES PATENT AND TRADEMARK OFFICE
CERTIFICATE OF CORRECTION

PATENT NO.            : 8,617,676 B2                                  Page 1 of 1
APPLICATION NO.       : 13/478601
DATED                 : December 31, 2013
INVENTOR(S)           : Robert Siegl It is certified that error appears in the above-identified patent and that said Letters Patent is hereby corrected as shown below:

Title Page, item (73) Assignee: change "Alpha Werke Alwin Lehner GmbH & Co., KG" to --Alpla Werke Alwin Lehner GmbH & Co., KG--.

Signed and Sealed this
First Day of April, 2014

Michelle K. Lee
*Deputy Director of the United States Patent and Trademark Office*